United States Patent [19]

Zurfluh et al.

[11] Patent Number: 5,713,555
[45] Date of Patent: Feb. 3, 1998

[54] SADDLE SUPPORT ESPECIALLY FOR A BICYCLE

[76] Inventors: Louis Zurfluh, Grossriedstrasse 6, 6462 Seedorf; Mathias Reichmuth, Jaistweg 10, 6403 Küssnacht am Rigi, both of Switzerland

[21] Appl. No.: 457,818

[22] Filed: Jun. 1, 1995

[51] Int. Cl.⁶ .................................................. F16M 13/00
[52] U.S. Cl. .......................... 248/599; 248/631; 297/132
[58] Field of Search .............................. 248/599, 602, 248/631, 622, 574, 411, 412, 414; 267/132, 64.26, 64.28, 64.22, 140, 120, 118; 297/215.13, 215.14, 195.1, 344.19; 280/220, 226.1, 275, 278, 283; 16/49, 66

[56] References Cited

U.S. PATENT DOCUMENTS

| | | | |
|---|---|---|---|
| 588,993 | 8/1897 | Hindmarsh | 248/599 X |
| 598,186 | 2/1898 | Thompson | 248/599 X |
| 606,775 | 7/1898 | Berg | 248/631 X |
| 3,861,740 | 1/1975 | Tajima et al. | 297/215.13 |
| 3,891,236 | 6/1975 | Kuwano et al. | 267/132 X |
| 4,093,196 | 6/1978 | Bauer | 248/622 X |
| 4,386,766 | 6/1983 | Bauer et al. | 248/631 X |
| 4,681,292 | 7/1987 | Thomas | 297/195.1 X |
| 4,777,698 | 10/1988 | Lord | 16/66 |
| 4,792,128 | 12/1988 | Holley | 267/64.28 X |
| 4,807,856 | 2/1989 | Teckenbrock | 267/132 |
| 4,815,163 | 3/1989 | Simmons | 16/49 |
| 4,881,750 | 11/1989 | Hartmann | 267/64.26 X |
| 5,094,424 | 3/1992 | Hartway | 248/600 |
| 5,236,169 | 8/1993 | Johnsen | 248/561 |
| 5,242,157 | 9/1993 | Benenberger et al. | 267/64.28 X |
| 5,324,058 | 6/1994 | Massaro | 297/215.13 X |
| 5,380,026 | 1/1995 | Robinson | 248/622 X |
| 5,471,708 | 12/1995 | Lynch | 16/66 |

FOREIGN PATENT DOCUMENTS

| | | | |
|---|---|---|---|
| 0 225 012 | 6/1987 | European Pat. Off. | |
| 2 399 353 | 3/1979 | France . | |
| 1219290 | 6/1966 | Germany | 248/411 |
| 29 00 780 | 7/1980 | Germany . | |
| 94 01-934.7 | 5/1994 | Germany . | |
| 104 004 | 3/1924 | Switzerland . | |
| 682110 | 11/1952 | United Kingdom | 267/64.26 |
| 90/15748 | 12/1990 | WIPO | 280/220 |

Primary Examiner—Ramon O. Ramirez
Attorney, Agent, or Firm—Wenderoth, Lind & Ponack

[57] ABSTRACT

A saddle support, in particular for a bicycle, includes an outer pipe casing that can be positioned in an open pipe of a bicycle frame. A first piston-cylinder unit provides resilience and a second piston-cylinder unit provides height adjustment of a saddle. A piston rod of the first piston-cylinder unit has an upper end to support the saddle and extends shiftably inside a sheath-shaped piston rod of the second piston-cylinder unit which can be moved in the pipe casing. The two piston rods can be fixed relative to the pipe casing by respective clamping devices. Each piston rod is provided with a valve for adjusting the pressure of a medium in a chamber of the respective piston-cylinder unit. Such saddle support enables resilience and height adjustment of the saddle possible while riding.

54 Claims, 6 Drawing Sheets

5,713,555

SADDLE SUPPORT ESPECIALLY FOR A BICYCLE

BACKGROUND OF THE INVENTION

The invention relates to a saddle support, especially for a bicycle, and including an outer pipe casing which preferably can be positioned at different heights in an open pipe of a bicycle frame and which is formed as part of a piston-cylinder unit that includes a piston rod having an upper end to support a chamber filled with a compressible gaseous medium.

For bicycles and in particular for mountain bikes, the saddle should be capable of being adjusted during riding relative to the bicycle frame and corresponding to the slope of the land. Thus, the saddle should be adjusted downwardly for driving downwards and upwardly for driving up a mountain. The saddle additionally should be positioned flexibly so that it has resilience to absorb impacts occurring during riding over rough or hilly land.

In a known saddle support of the type mentioned above (CH-PS 104 004), a hollow cylindrical housing is inserted in a pipe section of the bicycle frame. A rod supporting the saddle is arranged to be shiftable up and down and is provided with a piston which is supported flexibly on a cushion of air enclosed in the housing. The piston, which is on the lower side of the piston rod and which is secure against twisting in a socket of the housing has an upper end that is bent and attached to the saddle. To limit the movement of the rod upwardly, the saddle support is connected with the bicycle frame by a belt and the saddle support is prevented from being moved out of the bicycle frame by the air cushion.

For this known saddle support with built-in resilience, the compression space could be connected to a discharge connection and the rod could be moved up and down by means of a pump. Such a height adjustment of the saddle can be conducted only when the rider of the bicycle dismounts and conducts appropriate manipulations.

SUMMARY OF THE INVENTION

The object of the present invention is to further provide a saddle support of the above type, that has a simple construction that enables the saddle to be adjusted to be flexible or rigid relative to the bicycle frame, and/or that enables the saddle to be adjusted in height through a practical lifting range during riding and fixed in a desired position.

This object is achieved in accordance with the invention in that the piston rod and the saddle are arranged flexibly and/or adjusted by height relative to a pipe casing, that such piston rod can be fixed by a clamping device to the pipe casing and that an operable valve is provided for adjusting the pressure of the medium in a chamber. With this design of the saddle support in accordance with the invention, a constructive, very simple solution is achieved, in which either a flexible or a rigid connection of the saddle to the bicycle frame and/or an adjustability of height is made possible while riding. In addition, the pressure in the chamber can be changed at any time.

In a very advantageous embodiment, the saddle can be selectively shifted flexibly, rigidly or by height while riding. This is achieved in that the piston rod holding the saddle is fit inside of a sheath-shaped further piston rod which can be moved longitudinally in the pipe casing of a second piston-cylinder unit. Such further piston rod is fixed in the pipe casing by a clamping device and it, and consequently the saddle, can be adjusted by height in a released mode of the clamping device.

BRIEF DESCRIPTION OF THE INVENTION

Exemplary embodiments of the invention as well as additional advantages thereof are described in detail in the following with reference to the accompanying drawings.

DETAILED DESCRIPTION OF THE INVENTION

Figure 1:
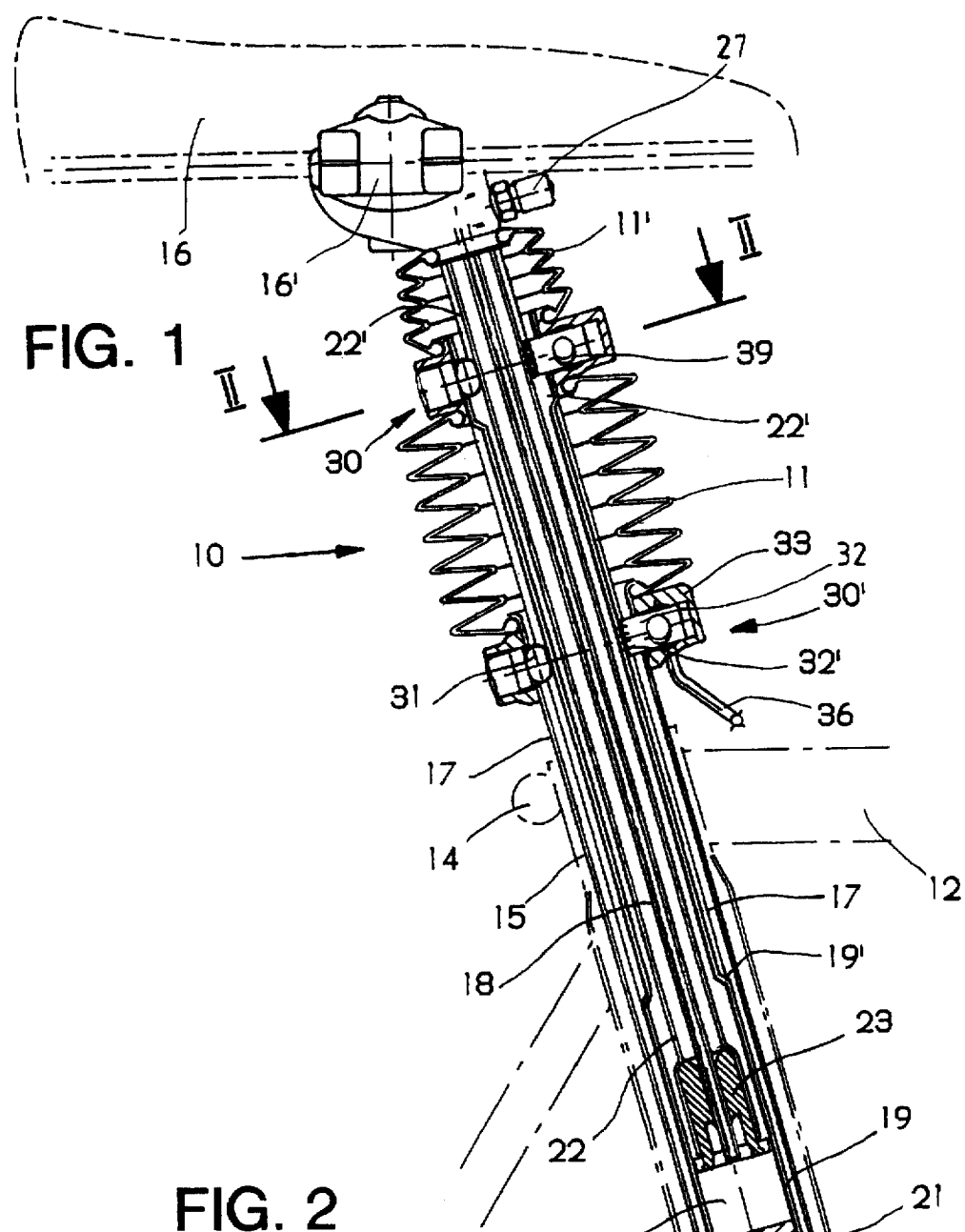
FIG. 1 is a longitudinal section through a saddle support in accordance with the invention.

FIG. 1 shows a saddle support 10 which can be positioned in an open pipe 13 of a bicycle frame 12 at different heights therein. The saddle support 10 has an outer pipe casing 15 which can be fitted smoothly into the open pipe 13 and can be fixed therein by means of a clamping device 14 which is illustrated schematically. The pipe casing 15, which is fitted in the open pipe 13 of the bicycle frame 12 and can be fixed relative thereto at a desired height, extends upwardly from pipe 13. A piston-cylinder unit 20 is fitted within casing 15 and includes a piston rod 22 which can be moved longitudinally and which supports at an outer end thereof a seat or saddle 16. A lower end of the piston rod 22 is connected to a piston 23 which is supported by a compressed gaseous medium, which is contained in a chamber 24 formed by the piston 23 and a cylinder 19 of piston-cylinder unit 20.

In accordance with the invention, the piston rod 22 and the saddle 16 are arranged flexibly relative to the pipe casing 15 and adjustably in height. The piston rod 22 holding the saddle 16 on the upper end is fitted within cylinder 19 that also defined a sheath-shaped piston rod of a second piston-cylinder unit 40 which can be moved longitudinally in the pipe casing 15. The pipe casing 15 defines the cylinder of piston-cylinder unit 40 and is closed at the bottom to define chamber 25 with a piston peg 21 connected to the cylinder/ piston rod 19. Piston rod 19 is fixed by means of a clamping device 30' attached to the upper end of the pipe casing 15. Upon releasing clamping device 30', piston rod 19 and consequently saddle 16 can be adjusted in height by the body weight of a rider sitting on the saddle, whereas resilience of the saddle 16 is due to the piston rod 22 being pressured by pressure within chamber 24. Piston peg 21 can be adjusted over nearly the entire length of pipe casing 15. Piston rod 19 extends through clamping device 30' to nearly underneath the saddle 16. A clamping device 30 fixed on the upper end of piston rod 19 clamps piston rod 22.

In the chamber 25 formed between pipe casing 15 and piston 21 inserted therein is a compressed gaseous medium, in particular air, introduced through valve 26 attached tightly in particular on the lower end of the pipe casing 15. Piston 21 preferably is provided with a recess 21' facing chamber 25, whereby the volume of the chamber 25 or the quantity of air therein is increased and such air is compressed over a longer path of movement of piston 21. The valve 26 is advantageously is a non-return valve, i.e. is of the type such that air, for example, can be introduced in a non-return manner into chamber 25, but that air filled to an over-pressure can be let out in a known manner, for example by manually opening such valve. The valve 26 additionally is designed to have the advantage that a pump used for pumping up a tire tube of the bicycle can be coupled to valve 26 by means of which air can be fed into chamber 25. To the end, however, the saddle support 10 must be taken out of the pipe 13. Through the selective adjustment of the air pressure in this chamber 25, the saddle 16 can be pushed downward as needed with more or less energy expenditure with the clamping device 30' released. It is recommended to adjust the pressure of the body weight of a person using the bicycle, so that such person sitting on the saddle can effect a movement of the saddle downwards with little additional body pressure. When such person wishes to adjust the saddle higher, the saddle will shift upwardly after releasing the clamping device 30' and after the weight of such person is raised from the saddle. This allows a completely individualized adjustment, which is a further advantage of this invention.

The piston rod 19 has two opposing channel-shaped longitudinal grooves 17 extending parallel to the longitudinal axis. Grooves 17 extend from above the piston 21 to nearly the upper end of the piston rod 19, whereby a connection element 31 engaged in one longitudinal groove 17 and a releasable clamping unit 32 engaged in the other are presented from twisting or rotating relative to piston rod 19. In this way, piston rod 19 is held in pipe casing 156 so that it is secure against twisting relative thereto but so that it can be shifted within limits relative thereto axially thereof.

The piston rod 22 and the piston 23 connected thereto are arranged movably within the piston rod 19, that forms a cylinder relative thereto, over a limited stroke. Piston rod 19 has a tapering 19' which limits an upper end position of the piston 23 and which is formed by the longitudinal grooves 17. The lower end position of piston 23 is determined by the maximum possible compression of the medium in the chamber 24 and by piston 21 that defines the end of the cylinder of unit 20. The chamber 24 is connected to a valve 27 arranged under the saddle 16 by a conduit 18 extending through the piston 23 and the piston rod 22. Valve 27 is similar to the valve 26 described above. A softer or harder adjustment of resilience of the saddle 16 is produced by the pressure selected as needed, which in turn is dependent on the body weight and also the demands of each individual rider. In addition, when fixing the clamping device 30 underneath the saddle 16, this pneumatic resilience is removed and rigid connection is produced between the piston rod 22 and the piston rod 19 surrounding the latter and holding the clamping device 30 on the upper end thereof. Between the clamping device 30, 30' is a round shock absorber 11 and between the saddle 16 and clamping device 30 is a round shock absorber 11'. Shock absorbers 11, 11' surround and protect piston rods 19, 22. The saddle 16 is connected with the piston rod 22 in a customary manner by joint connection 16' which is not described in detail.

Figure 2:
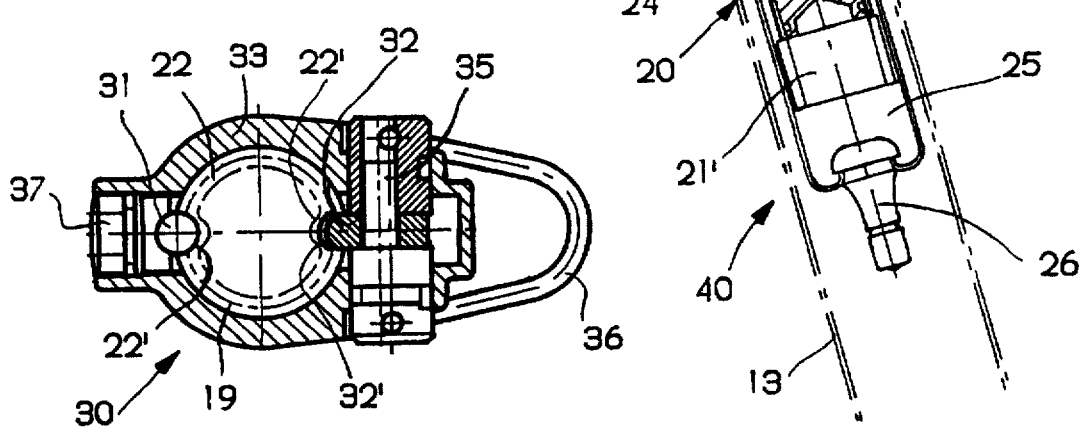
FIG. 2 is a transverse section of the saddle support according to FIG. 1 taken along line II—II.

FIG. 2 shows the clamping device 30 which is attached to the upper end of the piston rod 19 and essentially includes a holding ring 33 which encompasses the latter, a connection element 31, a clamping unit 32, and an eccentric pressure member 35 operably by a clamping strap 36. Connection element 31 is pin-shaped, is positioned via a screw 37 or similar item in the holding ring 33, and engages interlockingly in a longitudinal groove 22' formed in piston rod 22. The opposing clamping unit 32 can be moved inwardly or outwardly in an opposite groove 22' by the eccentric pressure member 35 by swivelling of the clamping strap 36 connected thereto. The member 35 extends through a longitudinal groove 39 through the clamping unit 32 perpendicular to the shifting direction. Member 35 preferably has a cross section such that it is braced in a self-restraining manner when pushing the clamping unit 32 toward complete engagement in respective groove 22'. The front side of the clamping unit 32 and the confronting side of piston rod 22 in the area of the respective longitudinal groove 22' thereof each have complementary teeth 32' which engage one another with the clamping unit 32 pushed in, thus providing an interlocking connection therebetween. The teeth advantageously are of a saw-tooth shape, with a lower tooth flank of the piston rod being nearly perpendicular to the longitudinal axis thereof and with an upper tooth flank extending at an angle, for example between 30 and 60 degrees thereto. The tooth flanks of the clamping unit are designed reversely. This makes an optimally effective clamping of the piston rod possible, and an axial shifting thereof downwardly is especially prevented.

The clamping device 30' is designed analogously to the clamping device 30 as described in detail above and description thereof therefore is omitted. The only difference is that the piston rod 19 can be fixed or released, and device 30 has a somewhat larger outer diameter. The longitudinal grooves 17 of the piston rod 19 are obtained by forming in the sheath-shaped wall thereof. The oblong indentations formed in this way on the inner side of this piston rod 19 engage in the longitudinal grooves 22' of the piston rod 22.

With the above design of the saddle support 10 in accordance with the invention, resilience of the saddle and height adjustment independent thereof are available to the rider. The rider can turn resilience on or off or change the height of the seat at any time while riding. For example, when riding up or down a mountain, the rider may want to adjust the saddle upwardly or downwardly to shift the center of gravity and to reduce the danger of falling.

Figure 3:
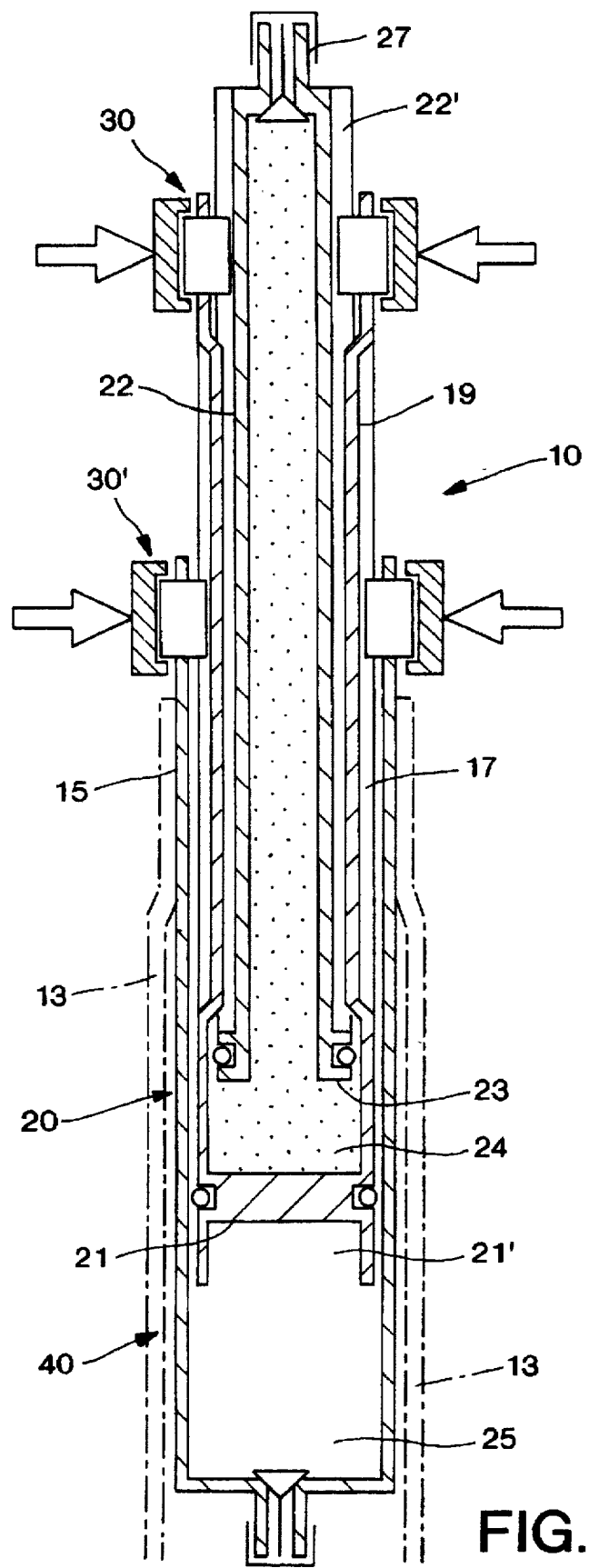
FIG. 3 is a schematic longitudinal section of the saddle support of FIG. 1.

The schematic depiction of the saddle support 10 in accordance with FIG. 3 illustrates once again the construction and operation thereof. The saddle support 10 provides resilience as well as a height adjustment for the saddle to the two piston-cylinder units 20, 40 included in the pipe casing 15 that can be contained in a pipe 13 of a bicycle frame. The piston-cylinder unit 20 for the flexible support of the saddle is thus formed within the piston rod 19 of the piston-cylinder unit 40. A simple and shortest construction of the saddle support is achieved in total in this manner.

Figure 4:
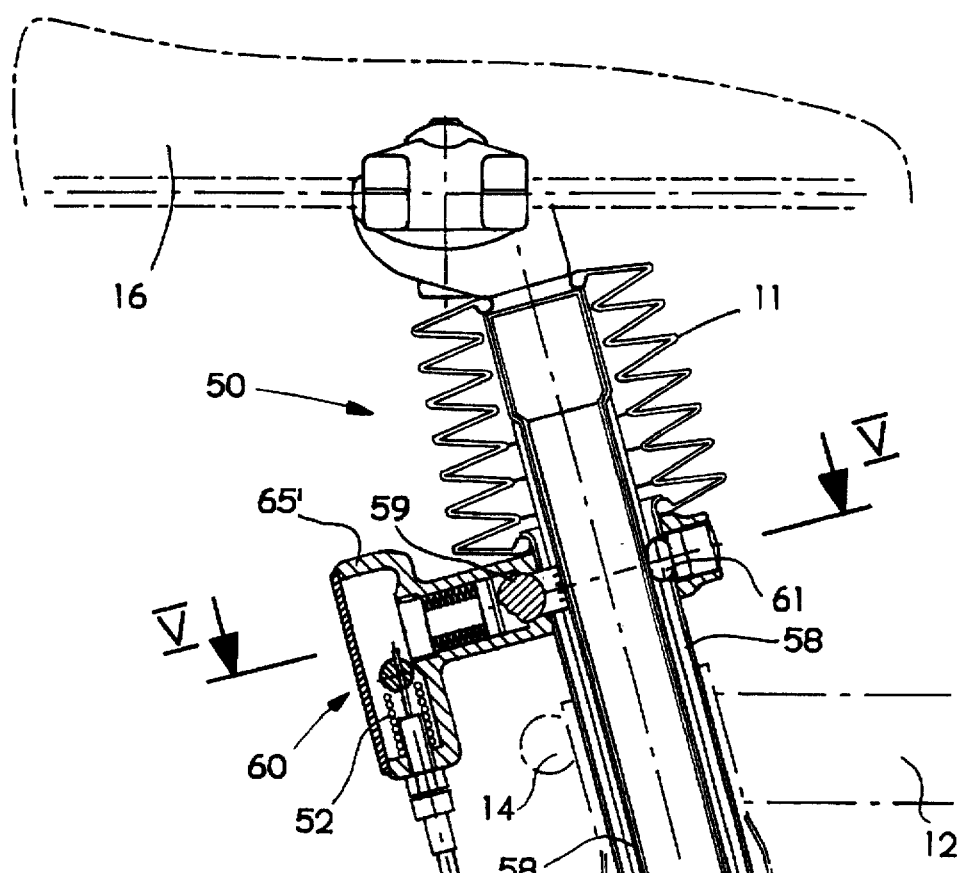
FIG. 4 is a longitudinal section through another embodiment of a saddle support which can be shifted to adjust the height in a bicycle frame.

FIG. 4 shows a saddle support 50 which can be fixed in an open pipe 13 of a bicycle frame 12 by a clamping device 14. Support 50 has only a pneumatically supported height adjustability in contrast to the embodiment shown in FIG. 1, but not of resilience of the saddle 16. Such a saddle support 50 is suitable therefore preferably for racing bicycles for which resilience is not necessary.

For height adjustment of the saddle 16, a piston-cylinder unit 55 is integrated in a pipe casing 51. The unit includes a hollow piston rod 56 which is open at the bottom underneath, the pipe casing 51 forming the cylinder, a chamber 57 containing a compressible gaseous medium, and a valve 26. This piston-cylinder unit 55 functions the same as the comparable unit in FIG. 1, and therefore only differences will be explained. Pipe-shaped piston rod 56 has two opposing channel-shaped longitudinal grooves 58 which extend along the longitudinal axis and which engages a correspondingly formed connection element 61 and a clamping unit 62 of a clamping device 60 attached to the upper end of the pipe casing 51. Device 60 holds piston rod 56 in the pipe casing 51 so that it is secure against turning but so that it can be shifted longitudinally up and down within limits. Furthermore, a maximal possible volume of chamber 57 for the gaseous medium is achieved by the hollow design of piston rod 56, the piston end of which can be shifted by an increased stroke length with a force that does not change significantly.

Figure 5:
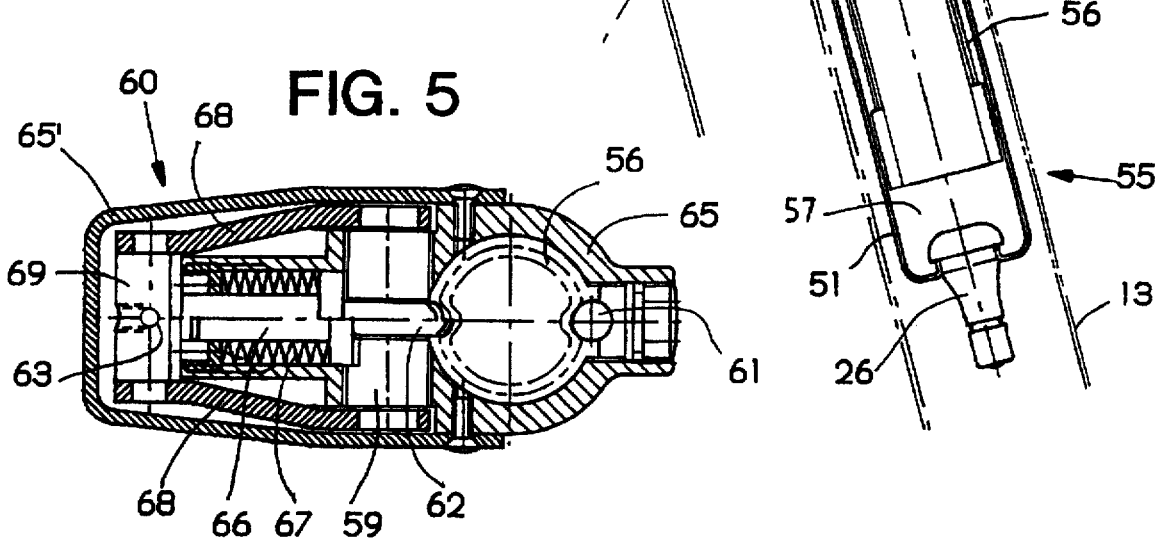
FIG. 5 is a transverse section of the saddle support of FIG. 4 taken along line V—V and showing clamped and released positions of a clamping device.

The clamping device 60 is shown in FIG. 5 and is similar to that shown in FIG. 1 and therefore will not be described in detail. The main different is that the shifting of the clamping device 62 does not occur via a swivelling strap 36 located by the pipe 13, but rather via a cable 63, which preferably extends to a handlebar of the bicycle which is not shown in more detail. A rider can therefore, similar to gear shifting by pressing a button or turning a switch lever, put clamping device 60 into two conditional modes, namely in one mode clamping the piston rod 56, per the upper half of FIG. 5, or in a released state, per the lower half of FIG. 5. To this end, a bolt 66 acted upon by a pressure spring 67 is arranged shiftably in a holding ring 65 that surrounds the piston rod 56 and that is connected to pipe casing 51. Bolt 66 pressed clamping unit 62 which has teeth, into engagement with teeth of the piston rod. By means of a rotary shaft 59, flattened on one side, the bolt 66 and with it the clamping unit 62 can be moved away from the piston rod 56, which then can be adjusted in height with the saddle 16. Shaft 59 is rotatable via a swivelling lever 68 gripping shaft 59 on both end thereof and a connection piece 69 connected to the cable and attached to piece 69. In a starting position, there is no pressure of the rotational shaft 59 on the bolt 66, in contrast to when the shaft 59 is turned by the pull of the cable 63, and thus the clamping unit 62 is pushed away from the piston rod. In contrast, the opposing connection element 61 remains stationary in the respective longitudinal groove of the piston rod 56. An additional pressure spring 52 is arranged in a housing 65' connected with the holding ring 65. Spring 52 provides that the rotational shaft 59 is swivelled into the starting position not pressing against the bolt 66 when no pulling force of the cable 63 occurs. With this clamping device, there is the advantage that is clamping force is not lost if the cable breaks and consequently the saddle does not suddenly shift downwardly.

Through the flattening of the rotational shaft 59 and its arrangement to the bolt 66, it is achieved that the clamping unit 62 shifts only slightly when turning the rotational shaft a relatively large distance to begin, in contrast to after a rotation of about 30 degrees, since the outer edge of the rotational shaft acting on the bolt 66 is moved then nearly perpendicular to the direction of the shifting of the bolt. When the cable is moved by a handle held flexibly on a handlebar, then a relatively large force is to be brought to bear to release the clamping device 60. This diminishes continually, whereby the release of the clamping device is solved optimally.

Figure 6:
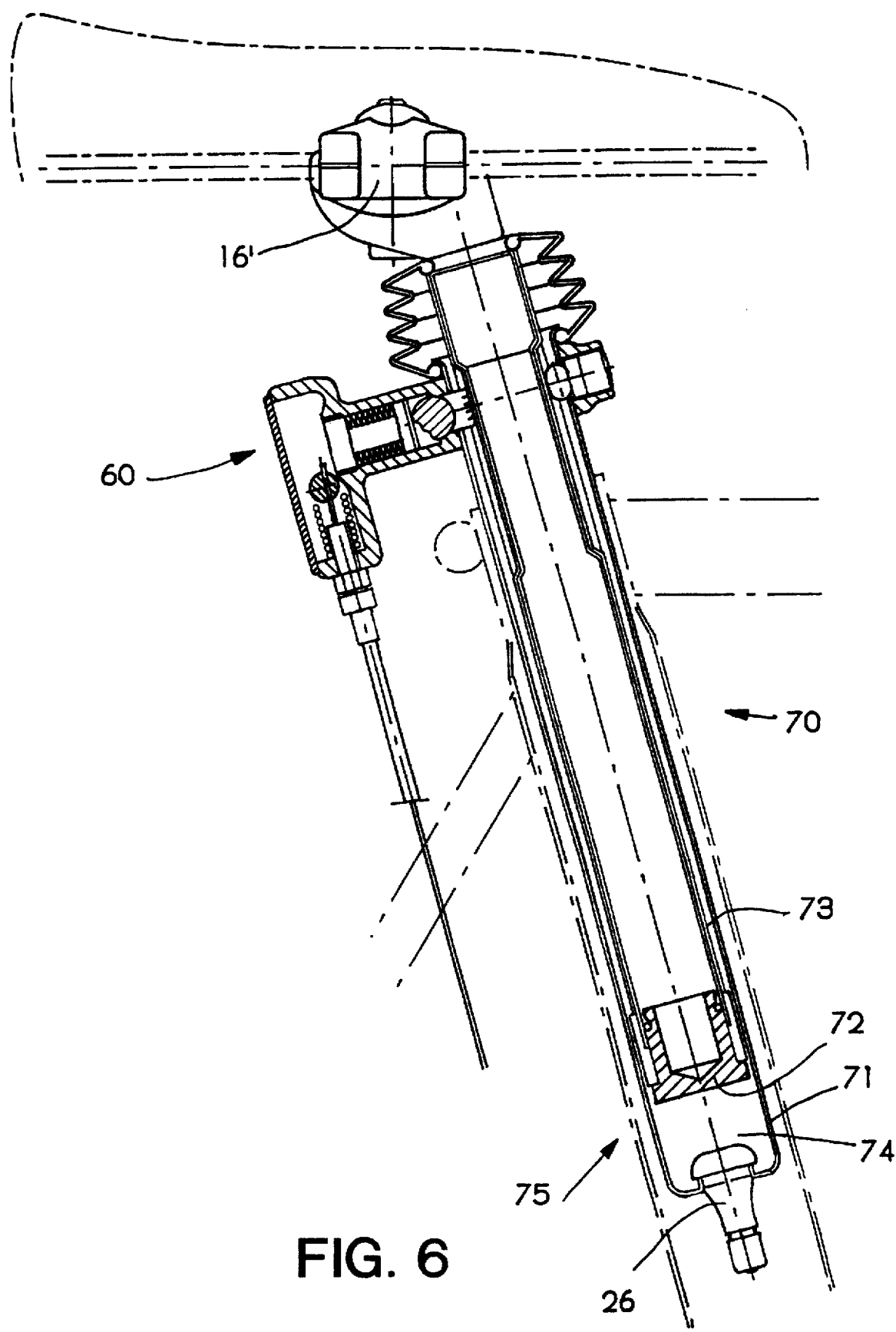
FIG. 6 is a longitudinal section of a variation of a saddle support.

The saddle support 70 in accordance with FIG. 6 differs from that in FIG. 4 in that a piston-cylinder unit 75 arranged in a pipe casing 71 is only provided for resilience of the saddle. Saddle support 70 has a clamping device 60, a shock absorber 11 and a typical joint connection 16' for the saddle. The saddle is attached on the upper end of a pipe-shaped piston rod 73 which extends through the pipe casing 71 and has a piston 72 which forms, with its underside and with the pipe casing 71, a chamber 74 filled with a compressible gaseous medium, e.g. by valve 26. The amount of medium is smaller than in FIG. 4, so that an optimal resilience is achieved. The clamping device 60 can, in turn, be operated advantageously from the bicycle handlebar, from where it can be put in the open or clamped positions. In the normal case, this is in the open position, in contrast to that in FIG. 4, so that the position rod 73 and the saddle 16 are flexibly positioned.

Figure 7:
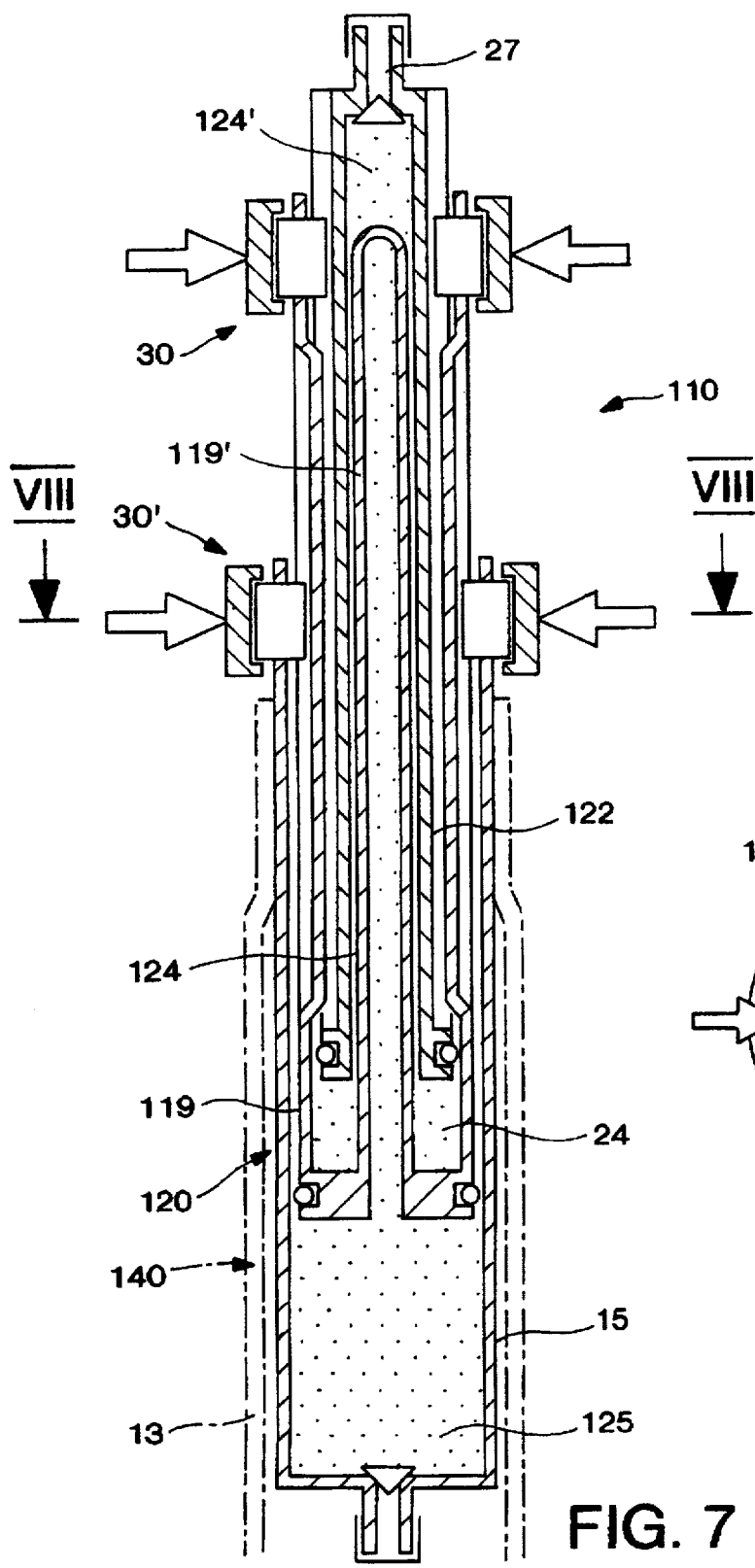
FIG. 7 is a schematic longitudinal section of a further variation of a saddle support.
Figure 8:
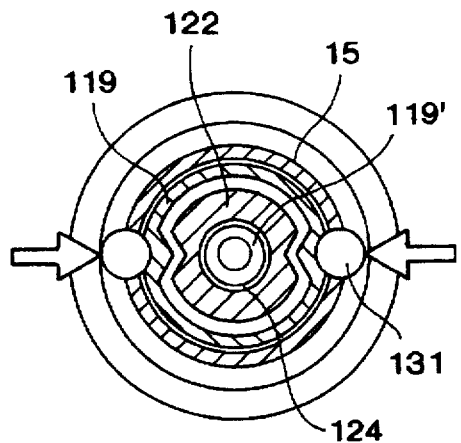
FIG. 8 is a transverse section of the saddle support of FIG. 7 taken along line VIII—VIII.

FIGS. 7 and 8 schematically show a saddle support 110 which is formed the same as the saddle support 10 in FIG. 1 with the following exceptions. Piston rods 119, 122 of piston-cylinder units 120, 140 are hollow cylindrical and open at lower ends thereof. Therefore, chamber 125 that is filled with air has a larger volume. This has the advantage noted above, namely that piston rod 119 responsible for height adjustment of the saddle can be adjusted over a longer stroke. The hollow cylindrical piston rod 119 defines therein chamber 24 through which extends inner pipe-shaped part 119' of piston rod 119. Piston rod 122 of the piston-cylinder unit 140 is movable between piston rod 119 and part 119' thereof. Between piston rod 122 and the part 119' is an annular gap 124 which extends from chamber 24 to an auxiliary chamber 124' formed between an upper side of part 119' and the hollow piston rod 122. Valve 27, enabled chamber 24 to be filled from the outside with medium at a regulatable pressure through chamber 124' and gap 124. Two clamping units 131 spaced by 180 degrees are shown in FIG. 8 and engage in channel-shaped longitudinal grooves of the piston rod 119.

Figure 9:
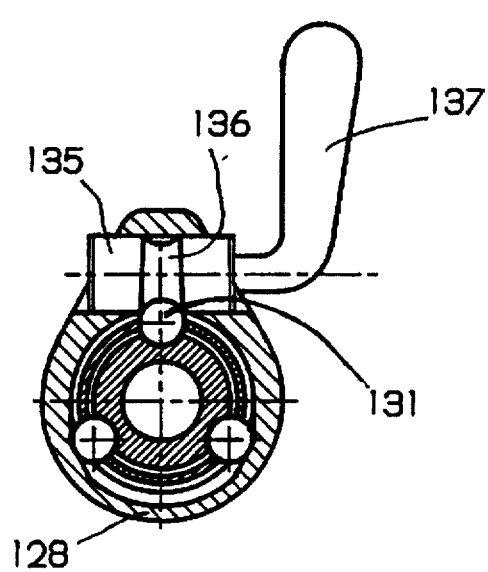
FIGS. 9–11 are transverse section of embodiments of a clamping device for releasably clamping a piston unit in a pipe casing.
Figure 10:
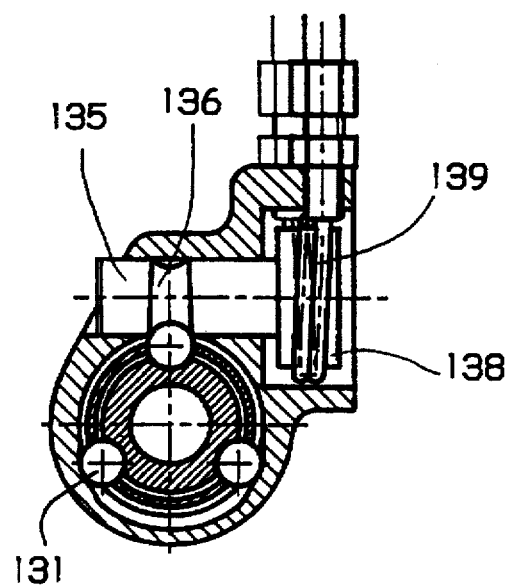
Figure 11:
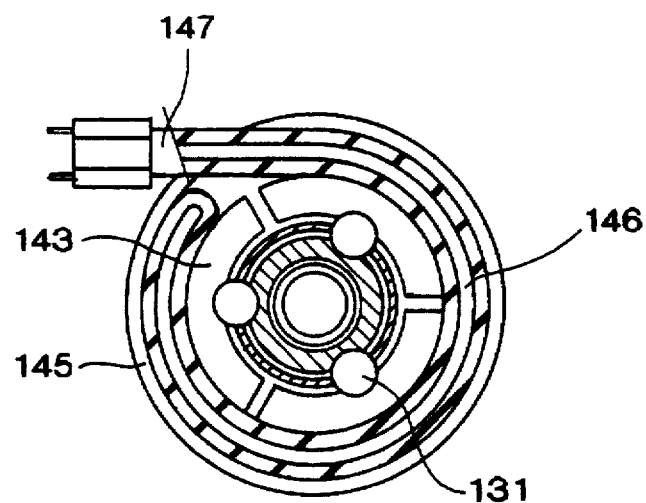

FIGS. 9 to 11 show three embodiments of clamping devices in which three clamping units 131 are spaced by 120 degrees. In the embodiments in accordance with FIGS. 9 and 10, a rotational peg or shaft 135 extends transverse to a piston rod and is positioned in a holding ring 128 attached to the piston rod. Shaft 135 has a ring groove 136 eccentric to its rotational axis. By turning shaft 137, one clamping unit 131 is pressed against the piston rod or released therefrom, whereby the other two clamping units 131 press or release the piston rod from the opposite side. The rotational shaft 135 is turned in FIG. 9 by a gripping lever 137 and in FIG. 10 by a cable 139 that is wound tightly without slipping on a roll 138 connected with shaft 135. In the embodiment of FIG. 11, the clamping devices 131 are pressed against a piston rod or released therefrom by a tube 147 which is closed on one end and which is passed about the piston rod as well as about the clamping units 131. The tube 147 is surrounded on the outside thereof by a housing 145 and abuts inwardly a multi-part ring 143 or similar item bordering the clamping units. To press the clamping units against the piston rod, a medium under pressure is filled into a space 146 in the tube 147, which thus expands radially inwardly and presses on the clamping units 131 via segments of ring 143.

A further advantage of the saddle support in accordance with the invention is that is can be retrofitted on an existing bicycle by its manufacturing being independent from that of the bicycle. The pipe casing in principle can be designed to have a cross section other than round. The piston-cylinder units are, of course, formed so that their chambers are completely sealed. The pressure in such chambers can diminish somewhat over time and can be restored through the valve or valves by a bicycle pump or similar item. The saddle support in accordance with the invention is suitable in particular for bicycles, but also could be used for the seat of a vehicle or an office chair or other application. The invention of course can be embodied in additional variations but is, however, sufficiently disclosed in the described exemplary embodiments.

We claim:

1. A saddle support for supporting a saddle of an article, said saddle support comprising:

an outer pipe casing of a configuration to be positionable at different heights within an open pipe portion of a frame of the article;

said outer pipe casing defining a cylinder of at least one piston-cylinder unit;

said at least one piston-cylinder unit including a saddle-supporting piston rod having an upper end to be connected to the saddle;

said at least one piston-cylinder unit having therein a chamber to be filled with a pressurized medium to thereby urge said saddle-supporting piston rod upwardly relative to said outer pipe casing;

said at least one piston-cylinder unit comprising a first piston-cylinder unit operable to provide resilient support for the saddle and a second piston-cylinder unit operable to provide height adjustment for the saddle, said saddle-supporting piston rod comprising a piston rod of said first piston-cylinder unit and being slidably mounted in a sheath-shaped piston rod of said second piston-cylinder unit that is movably mounted in said outer pipe casing;

a valve communicating with said chamber to control supply of the pressurized medium thereto; and clamping means operably associated with said saddle-supporting piston rod to be moved selectively by an operator seated on the saddle between a clamping position, whereat said saddle-supporting piston rod is fixedly positioned relative to said outer pipe casing, and a released position, whereat said saddle-supporting piston rod is movable relative to said outer pipe casing.

2. A saddle support as claimed in claim 1, wherein said outer pipe casing comprises a cylinder of said second piston-cylinder unit, said sheath-shaped piston rod is connected to a piston that defines with said outer pipe casing another chamber to be filled with a pressurized medium to thereby urge said piston upwardly relative to said outer pipe casing, and said saddle-supporting piston rod is connected to a piston that is slidable in said sheath-shaped piston rod and that defines therewith said chamber.

3. A saddle support as claimed in claim 2, wherein said sheath-shaped piston rod comprises a cylinder of said first piston-cylinder unit.

4. A saddle support as claimed in claim 1, wherein said clamping means comprises a clamping device attached to an upper end of said sheath-shaped piston rod and operable to clamp said saddle-supporting piston rod.

5. A saddle support as claimed in claim 4, further comprising another clamping device attached to an upper end of said outer pipe casing and operable to clamp said sheath-shaped piston rod.

6. A saddle support as claimed in claim 1, wherein said sheath piston rod and said saddle-supporting piston rod each comprise a hollow cylinder with an open lower end, and further comprising an inner pipe-shaped part integral with said lower end of said sheath-shaped piston rod and extending upwardly therefrom through said open lower end of said saddle-supporting piston rod, said inner pipe-shaped part having a closed upper end.

7. A saddle support as claimed in claim 1, further comprising means for preventing said saddle-supporting piston rod from rotating relative to said clamping means when said clamping means is in said released position thereof.

8. A saddle support as claimed in claim 7, wherein said preventing means comprises at least one longitudinal groove formed in the exterior of said saddle-supporting piston rod, and at least one member of said clamping means extending into said groove when said clamping means is in said released position thereof.

9. A saddle support as claimed in claim 8, comprising at least two said grooves and two said members.

10. A saddle support as claimed in claim 9, wherein one of said at least two members comprises a connection element, and another of said at least two members comprises a clamping element.

11. A saddle support as claimed in claim 10, wherein said clamping element has teeth to engage complementary teeth in a respective said groove.

12. A saddle support as claimed in claim 1, wherein said valve comprises a non-return valve.

13. A saddle support as claimed in claim 1, wherein said clamping means comprises a holding ring encompassing said piston rod, and a clamping unit mounted on said holding ring for movement relative thereto toward and away from said piston rod.

14. A saddle support as claimed in claim 13, further comprising an eccentric member mounted on said holding ring for eccentric rotation relative thereto and operable to move said clamping unit.

15. A saddle support as claimed in claim 14, further comprising lever means connected to said eccentric member for enabling manual rotation thereof by the operator while seated on the saddle.

16. A saddle support as claimed in claim 13, further comprising a spring urging said clamping unit toward said piston rod, and means for moving said clamping unit away from said piston rod against said spring.

17. A saddle support as claimed in claim 16, wherein said moving means comprises a cable-operated lever.

18. A saddle support as claimed in claim 13, wherein said clamping unit is movable radially of said piston rod.

19. A saddle support as claimed in claim 13, further comprising a connection element on said holding ring and operable to prevent twisting of said piston rod relative to said holding ring when said clamping unit is moved away from said piston rod.

20. A saddle support for supporting a saddle of an article, said saddle supporting comprising:

an outer pipe casing of a configuration to be positionable at different heights within an open pipe portion of a frame of the article;

said outer pipe casing defining a cylinder of at least one piston-cylinder unit;

said at least one piston-cylinder unit including a saddle-supporting piston rod having an upper end to be connected to the saddle;

said at least one piston-cylinder unit having therein a chamber to be filled with a pressurized medium to thereby urge said saddle-supporting piston rod upwardly relative to said outer pipe casing;

said at least one piston-cylinder unit comprising only one piston-cylinder unit, said outer pipe casing comprising a cylinder of said one piston-cylinder unit, said saddle-supporting piston rod being slidable within said outer pipe casing and defining therewith said chamber, and said saddle-supporting piston rod comprising a hollow cylinder with an open lower end;

a valve communicating with said chamber to control supply of the pressurized medium thereto; and clamping means operably associated with said saddle-supporting piston rod to be moved selectively by an operator seated on the saddle between a clamping position, whereat said saddle-supporting piston rod is fixedly positioned relative to said outer pipe casing, and a released position, whereat said saddle-supporting piston rod is movable relative to said outer pipe casing.

21. A saddle support as claimed in claim 20, wherein said clamping means comprises a clamping device attached to an upper end of said outer pipe casing and operable to clamp said saddle-supporting piston rod.

22. A saddle support as claimed in claim 20, further comprising means for preventing said saddle-supporting piston rod from rotating relative to said clamping means when said clamping means is in said released position thereof.

23. A saddle support as claimed in claim 22, wherein said preventing means comprises at least one longitudinal groove formed in the exterior of said saddle-supporting piston rod, and at least one member of said clamping means extending into said groove when said clamping means is in said released position thereof.

24. A saddle support as claimed in claim 23, comprising at least two said grooves and two said members.

25. A saddle support as claimed in claim 24, wherein one of said at least two members comprises a connection element, and another of said at least two members comprises a clamping element.

26. A saddle support as claimed in claim 25, wherein said clamping element has teeth to engage complementary teeth in a respective said groove.

27. A saddle support as claimed in claim 20, wherein said valve comprises a non-return valve.

28. A saddle support as claimed in claim 20, wherein said clamping means comprises a holding ring encompassing said piston rod, and a clamping unit mounted on said holding ring for movement relative thereto toward and away from said piston rod.

29. A saddle support as claimed in claim 28, further comprising an eccentric member mounted on said holding ring for eccentric rotation relative thereto and operable to move said clamping unit.

30. A saddle support as claimed in claim 29, further comprising lever means connected to said eccentric member for enabling manual rotation thereof by the operator while seated on the saddle.

31. A saddle support as claimed in claim 28, further comprising a spring urging said clamping unit toward said piston rod, and means for moving said clamping unit away from said piston rod against said spring.

32. A saddle support as claimed in claim 31, wherein said moving means comprises a cable-operated lever.

33. A saddle support as claimed in claim 28, wherein said clamping unit is movable radially of said piston rod.

34. A saddle support as claimed in claim 28, further comprising a connection element on said holding ring and operable to prevent twisting of said piston rod relative to said holding ring when said clamping unit is moved away from said piston rod.

35. A saddle support for supporting a saddle of an article, said saddle support comprising:

an outer pipe casing of a configuration to be positionable at different heights within an open pipe portion of a frame of the article;

said outer pipe casing defining a cylinder of at least one piston-cylinder unit;

said at least one piston-cylinder unit including a saddle-supporting piston rod having an upper end to be connected to the saddle;

said at least one piston-cylinder unit having therein a chamber to be filled with a pressurized medium to thereby urge said saddle-supporting piston rod upwardly relative to said outer pipe casings;

a valve communicating with said chamber to control supply of the pressurized medium thereto;

clamping means operably associated with said saddle-supporting piston rod to be moved selectively by an operator seated on the saddle between a clamping position, whereat said saddle-supporting piston rod is fixedly positioned relative to said outer pipe casing, and a released position, whereat said saddle-supporting piston rod is movable relative to said outer pipe casing; and means for preventing said saddle-supporting piston rod from rotating relative to said clamping means when said clamping means is in said released position thereof, said preventing means comprising at least one longitudinal groove formed in the exterior of said saddle-supporting piston rod, and at least one member of said clamping means extending into said groove when said clamping means is in said released position thereof.

36. A saddle support as claimed in claim 35, comprising at least two said grooves and two said members.

37. A saddle support as claimed in claim 36, wherein one of said at least two members comprises a connection element, and another of said at least two members comprises a clamping element.

38. A saddle support as claimed in claim 37, wherein said clamping element has teeth to engage complementary teeth in a respective said groove.

39. A saddle support as claimed in claim 35, wherein said valve comprises a non-return valve.

40. A saddle support as claimed in claim 35, wherein said clamping means comprises a holding ring encompassing said piston rod, and a clamping unit mounted on said holding ring for movement relative thereto toward and away from said piston rod.

41. A saddle support as claimed in claim 40, further comprising an eccentric member mounted on said holding ring for eccentric rotation relative thereto and operable to move said clamping unit.

42. A saddle support as claimed in claim 41, further comprising lever means connected to said eccentric member for enabling manual rotation thereof by the operator while seated on the saddle.

43. A saddle support as claimed in claim 40, further comprising a spring urging said clamping unit toward said piston rod, and means for moving said clamping unit away from said piston rod against said spring.

44. A saddle support as claimed in claim 43, wherein said moving means comprises a cable-operated lever.

45. A saddle support as claimed in claim 40, wherein said clamping unit is movable radially of said piston rod.

46. A saddle support as claimed in claim 40, further comprising a connection element on said holding ring and operable to prevent twisting of said piston rod relative to said holding ring when said clamping unit is moved away from said piston rod.

47. A saddle support for supporting a saddle of an article, said saddle support comprising:

an outer pipe casing of a configuration to be positionable at different heights within an open pipe portion of a frame of the article;

said outer pipe casing defining a cylinder of at least one piston-cylinder unit;

said at least one piston-cylinder unit including a saddle-supporting piston rod having an upper end to be connected to the saddle;

said at least one piston-cylinder unit having therein a chamber to be billed with a pressurized medium to thereby urge said saddle-supporting piston rod upwardly relative to said outer pipe casing;

a valve communicating with said chamber to control supply of the pressurized medium thereto; and clamping means operably associated with said saddle-supporting piston rod to be moved selectively by an operator seated on the saddle between a clamping position, whereat said saddle-supporting piston rod is fixedly positioned relative to said outer pipe casing, and a released position, whereat said saddle-supporting piston rod is movable relative to said outer pipe casing, said clamping means comprising a holding ring encompassing said piston rod, and a clamping unit mounted on said holding ring for movement relative thereto toward and away from said piston rod.

48. A saddle support as claimed in claim 47, wherein said valve comprises a non-return valve.

49. A saddle support as claimed in claim 47, further comprising an eccentric member mounted on said holding ring for eccentric rotation relative thereto and operable to move said clamping unit.

50. A saddle support as claimed in claim 49, further comprising lever means connected to said eccentric member for enabling manual rotation thereof by the operator while seated on the saddle.

51. A saddle support as claimed in claim 47, further comprising a spring urging said clamping unit toward said piston rod, and means for moving said clamping unit away from said piston rod against said spring.

52. A saddle support as claimed in claim 51, wherein said moving means comprises a cable-operated lever.

53. A saddle support as claimed in claim 47, wherein said clamping unit is movable radially of said piston rod.

54. A saddle support as claimed in claim 47, further comprising a connection element on said holding ring and operable to prevent twisting of said piston rod relative to said holding ring when said clamping unit is moved away from said piston rod.

* * * * *